US011402697B2

(12) United States Patent
Nagasawa et al.

(10) Patent No.: US 11,402,697 B2
(45) Date of Patent: Aug. 2, 2022

(54) DISPLAY DEVICE

(71) Applicant: Japan Display Inc., Tokyo (JP)

(72) Inventors: Junko Nagasawa, Tokyo (JP); Kasumi Hase, Tokyo (JP)

(73) Assignee: Japan Display Inc., Tokyo (JP)

( * ) Notice: Subject to any disclaimer, the term of this patent is extended or adjusted under 35 U.S.C. 154(b) by 79 days.

(21) Appl. No.: 16/951,509

(22) Filed: Nov. 18, 2020

(65) Prior Publication Data

US 2021/0165254 A1 Jun. 3, 2021

(30) Foreign Application Priority Data

Nov. 29, 2019 (JP) .............................. JP2019-216569

(51) Int. Cl.
*G02F 1/1339* (2006.01)
*G02F 1/1333* (2006.01)
*G09F 9/30* (2006.01)
*G06F 1/18* (2006.01)
*G02F 1/1362* (2006.01)

(52) U.S. Cl.
CPC ...... *G02F 1/1339* (2013.01); *G02F 1/133305* (2013.01); *G02F 1/136286* (2013.01); *G06F 1/189* (2013.01); *G09F 9/301* (2013.01)

(58) Field of Classification Search
CPC ................................................... G02F 1/1339
See application file for complete search history.

(56) References Cited

U.S. PATENT DOCUMENTS

2014/0118676 A1* 5/2014 Liang .................... G02F 1/1339
349/153

FOREIGN PATENT DOCUMENTS

JP 2006-84906 A 3/2006
JP 2006-91200 A 4/2006

* cited by examiner

*Primary Examiner* — Edmond C Lau
(74) *Attorney, Agent, or Firm* — Oblon, McClelland, Maier & Neustadt, L.L.P.

(57) ABSTRACT

According to one embodiment, a display device includes a first substrate, a second substrate opposing the first substrate, a first spacer projecting from the second substrate towards the first substrate and including a distal end portion opposing the first substrate with a gap therebetween, a second spacer projecting from the second substrate towards the first substrate and in contact with the first substrate and an adhesive member adhering the distal end portion and the first substrate together. A total height of the first spacer and the adhesive member is the same as a height of the second spacer.

16 Claims, 12 Drawing Sheets

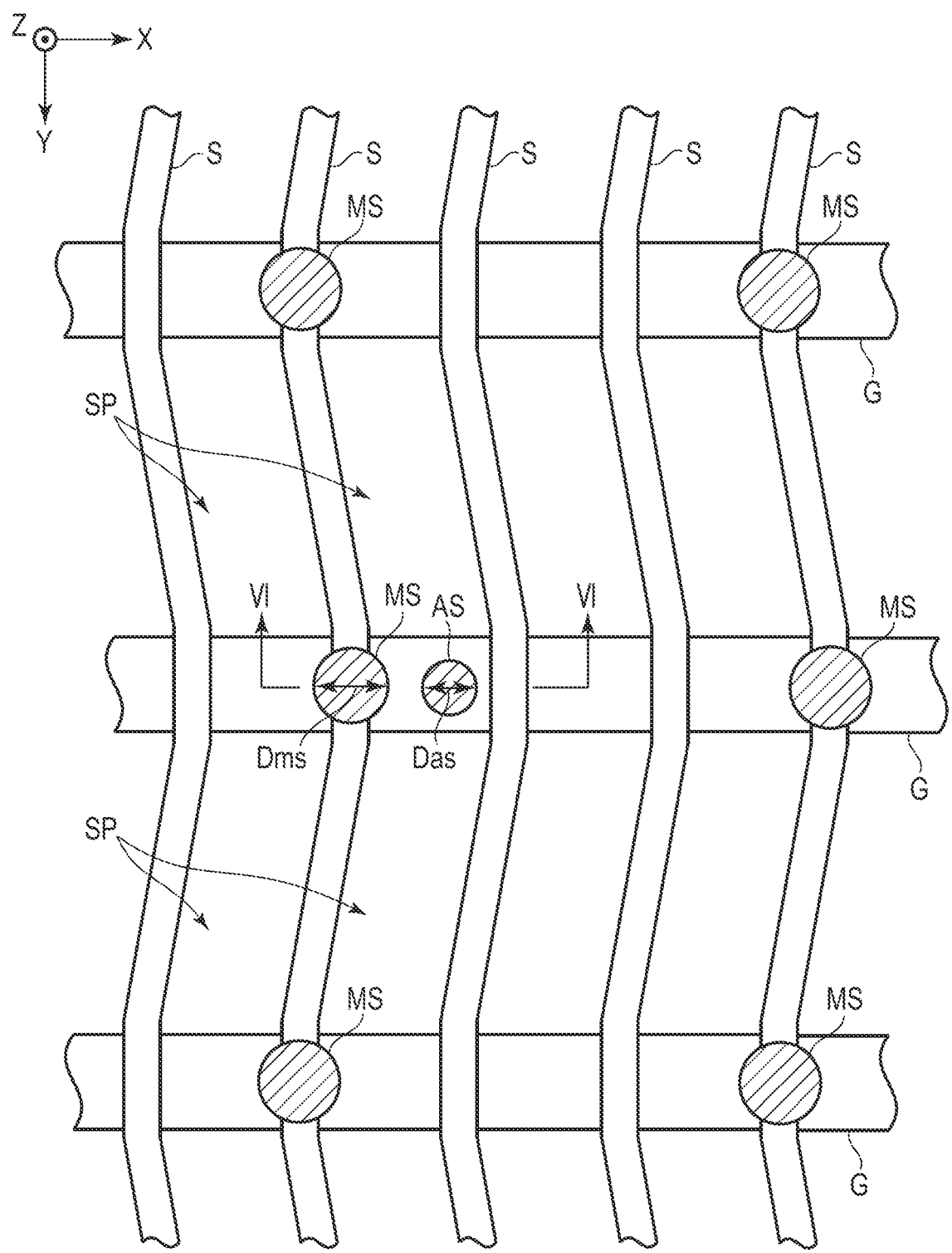
F I G. 5

DISPLAY DEVICE

CROSS-REFERENCE TO RELATED APPLICATIONS

This application is based upon and claims the benefit of priority from Japanese Patent Application No. 2019-216569, filed Nov. 29, 2019, the entire contents of which are incorporated herein by reference.

FIELD

Embodiments described herein relate generally to a display device.

BACKGROUND

Display devices, for example, liquid crystal display devices and the like, comprise a pair of substrates opposing each other. Between the pair of substrates, spacers which project from one substrate towards the other substrate are disposed. With the spacers, a cell gap between the substrates in the display area is maintained.

Generally, a distal end of the spacer is not attached to the other substrate. With this structure, when an external force is applied to the display device, the distal end of the spacer may move from a position where it originally should be. This may cause various types of drawbacks which induce degradation in display quality, for example, displacement of elements disposed on in both substrates.

In recent years, flexible-type display devices in which a display area can be bent are put into practical use. In display devices of this type, contraction of optical films attached on the substrates easily occurs, and also displacement of the substrates, caused by the external force applied on the display device, can easily occur.

BRIEF DESCRIPTION OF THE DRAWINGS

FIG. 5 is a plan view showing an example of arrangement of a main spacer and an adhesion spacer.

DETAILED DESCRIPTION

Figure 1:
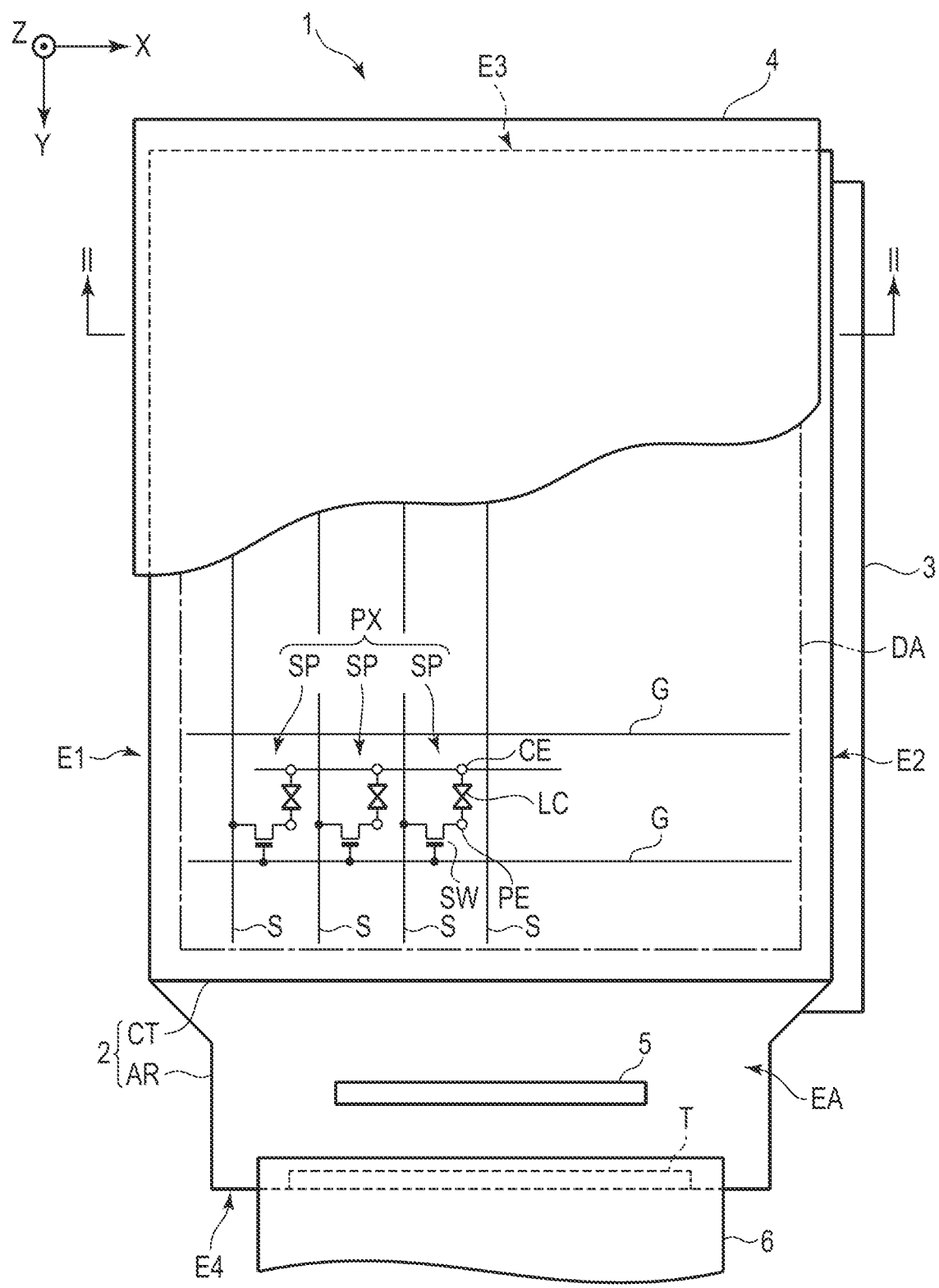
FIG. 1 is a plan view showing a schematic structure of a display device according to the first embodiment.

In general, according to one embodiment, a display device comprises a first substrate, a second substrate opposing the first substrate, a first spacer projecting from the second substrate towards the first substrate and including a distal end portion opposing the first substrate with a gap therebetween, a second spacer projecting from the second substrate towards the first substrate and in contact with the first substrate and an adhesive member adhering the distal end portion and the first substrate together. Further, a total height of the first spacer and the adhesive member is the same as a height of the second spacer.

With an improved structure of spacers disposed between a pair of substrates as described above, a display device with excellent display quality can be obtained.

Various embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings are illustrated schematically, rather than as an accurate representation of what is implemented. However, such schematic illustration is merely exemplary, and in no way restricts the interpretation of the invention. In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

In each of the embodiments, a liquid crystal display device is disclosed as an example of the display device. However, note that each embodiment does not prevent application of technical idea disclosed in each of the embodiments to display devices of the other types. For example, as the display devices of the other kinds, self-luminous display devices including an organic electroluminescent display element or a light emitting diode (LED) display element, an electronic paper-type display device including an electrophoretic element, a display device to which micro-electromechanical systems (MEMS) is applied, or a display device to which electrochromism is applied, and the like are assumed.

First Embodiment

FIG. 1 is a plan view schematically showing a liquid crystal display device 1 (hereinafter referred to as display device 1) according to the first embodiment. In the drawing, a first direction X, a second direction Y and a third direction Z are directions orthogonal to each other.

The display device 1 comprises a display panel 2, a backlight 3, a cover member 4, a controller 5 and a flexible printed circuit 6. The display panel 2 comprises an array substrate AR, a counter-substrate CT opposing the array substrate AR, and a liquid crystal layer LC sealed between the array substrate AR and the counter-substrate CT. The array substrate AR and the counter-substrate CT are examples of the first substrate and the second substrate.

In a portion where the array substrate AR and the counter-substrate CT overlap each other, the display panel 2 includes a display area DA. In the display area DA, the array substrate AR comprises a plurality of scanning lines G and a plurality of signal lines S. The scanning lines G extend along the first direction X and are arranged along the second direction Y. The signal lines S extend along the second direction Y and are arranged along the first direction X.

The display portion DA includes a plurality of pixels PX arrayed in a matrix. Each of the pixels PX includes sub-pixels corresponding to different colors. For example, each pixel PX include red, green, blue sub-pixel SP, but it may include a sub-pixel SP of some other color such as white or the like.

The array substrate AR comprises pixel electrodes PE and switching elements SW disposed in the respective sub-pixels SP. Further, the array substrate AR possesses common electrodes CE each extending over a plurality of sub-pixels SP. To the common electrodes CE, a common voltage is applied.

In the example shown in FIG. 1, the array substrate AR includes an extending area EA extending from a lower end of the counter-substrate CT, as seen in the figure. The controller 5 is mounted on the extending area EA. The extending area EA includes a terminal portion T for connection to external members. The flexible printed circuit 6 is connected to the terminal portion T. The flexible printed circuit 6 inputs a signal for image display to the display panel 2. Based on the signal, the controller 5 controls voltage of each pixel electrode PE.

The backlight 3 is disposed to oppose a rear surface of the array substrate AR. For example, the backlight 3 may be of an edge light-type which comprises a light guide and a light source opposing an edge portion of the light guide or may be a direct under type comprising a light source opposing the rear surface of the array substrate AR. The display device 1 may be of a reflective type which does not comprise a backlight 3. The cover member 4, which is made of, for example, glass, covers the display area DA.

The display panel 2 comprises a first side E1, a second side E2, a third side E3 and a fourth side E4. The first side E1 and the second side E2 extend parallel to the second direction Y. The third side E3 and the fourth side E4 extend parallel to the first direction X.

In the first side E1, the second side E2 and the third side E3, the edges of the array substrate AR coincide with corresponding edges of the counter-substrate CT. On the other hand, the fourth side E4 is located in an edge portion of the extending area EA along the second direction Y. That is, the fourth side E4 is equivalent to the edge portion of the array substrate AR.

In this embodiment, the array substrate AR and the counter-substrate CT are made flexible. Therefore, display panel 2 can be bent into an arbitrary shape. For example, the extending area EA may be bent such that the fourth side E4 is located on a rear surface side of the backlight 3.

Figure 2:
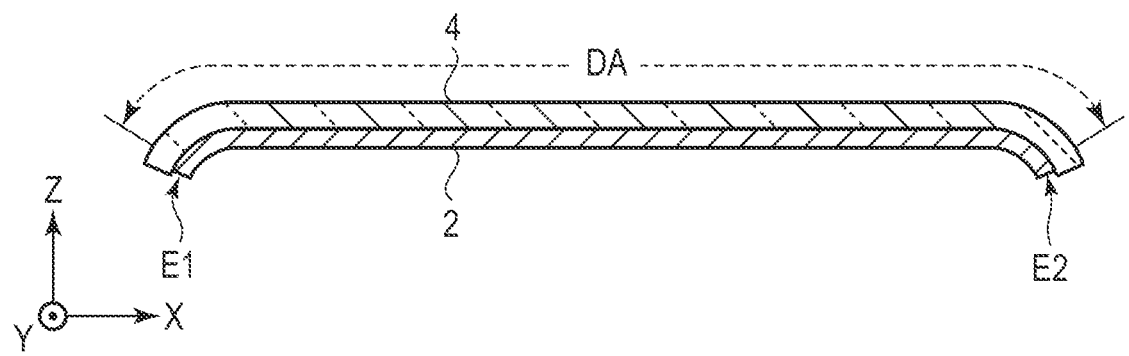
FIG. 2 is a schematic cross section of a display panel and a cover member, taken along line II-II in FIG. 1.

FIG. 2 is a cross sectional view schematically showing the display panel 2 and the cover member 4 taken along line II-II in FIG. 1. In the example illustrated, the display panel 2 and the cover member 4 are bent smoothly in the vicinities of the first side E1 and the second side E2.

For example, the portions of the display panel 2 bent in the vicinities of the first side E1 and the second side E2 include a part of the display area DA. With this configuration, the bent portion can also display images.

Note that the shapes of the display panel 2 and the cover member 4 are not limited to those of the example shown in FIG. 2. The display panel 2 and the cover member 4 may be bent into other shapes or may be entirely flat.

Figure 3:
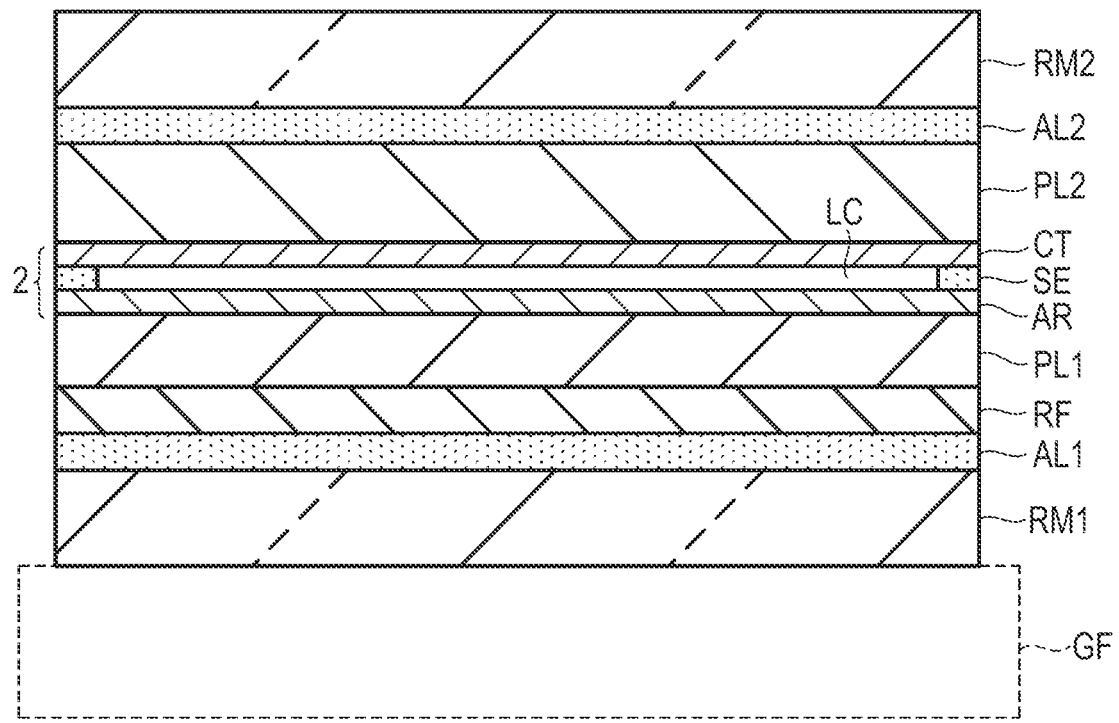
FIG. 3 is a cross section schematically showing the display panel and an example of elements attached on the panel.

Elements such as various kinds of optical films may be attached onto the display panel 2. FIG. 3 is a cross-sectional view schematically showing an example of the elements attached onto the display panel 2 and the panel.

The array substrate AR and the counter-substrate CT are adhered together by a circular sealing member SE. The liquid crystal layer LC is disposed in a space surrounded by the array substrate AR, the counter-substrate CT and the sealing member SE.

In the example shown in FIG. 3, a first polarizer PL1 is attached onto the array substrate AR, and a second polarizer PL2 is attached onto the counter-substrate CT. Further, a reflective polarizing film RF is attached on the first polarizer PL1.

The first polarizer PL1 and the second polarizer PL2 respectively have polarization axes normal to each other. The reflecting polarizing film RF transmits a particular polarized light component and reflects a polarized light component normal to the transmitted polarized light component.

To the reflecting polarizing film RF, a first reinforcing member RM1 is attached via a first adhesive layer AL1. To the second polarizer PL2, a second reinforcing member RM2 is attached via a second adhesive layer AL2. The first reinforcing member RM1 and the second reinforcing member RM2 are formed, for example, of polyethylene terephthalate (PET).

The first reinforcing member RM1 and the second reinforcing member RM2 inhibit deformation of the display panel 2, which may be caused by, for example, contraction of the polarizers PL1 and PL2 and the reflecting polarizing film RF. To the second reinforcing member RM2, the cover member 4 described above is attached.

In the manufacturing process of the display panel 2, a guiding film GF may be attached to the first reinforcing member RM1 as indicated by a broken line. The guiding film GF includes a base substance formed, for example, of polyolefin and an adhesive layer to attach the base substance onto the first reinforcing member RM1. The guiding film GF is detached after the cover member 4 is attached onto the display panel 2.

For example, the thickness of each of the array substrate AR and the counter-substrate CT is 10 μm, the thickness of the liquid crystal layer LC is 3 μm, and the thickness of the first polarizer PL1 is 45 μm, the thickness of the reflecting polarizing film RF is 31 μm, the thickness of each of the reinforcing members RM1 and RM2 is 50 μm, the thickness of each of the adhesive layers AL1 and AL2 is 25 μm, and the thickness of the guiding film GF is 110 μm.

Note that the thicknesses of these elements are not limited to the numeric values exemplified here. Further, the stacked structure including the display panel 2 is not limited to that shown in FIG. 2, but part of the elements illustrated element may not necessarily be included, or some other element may be further included.

Figure 4:
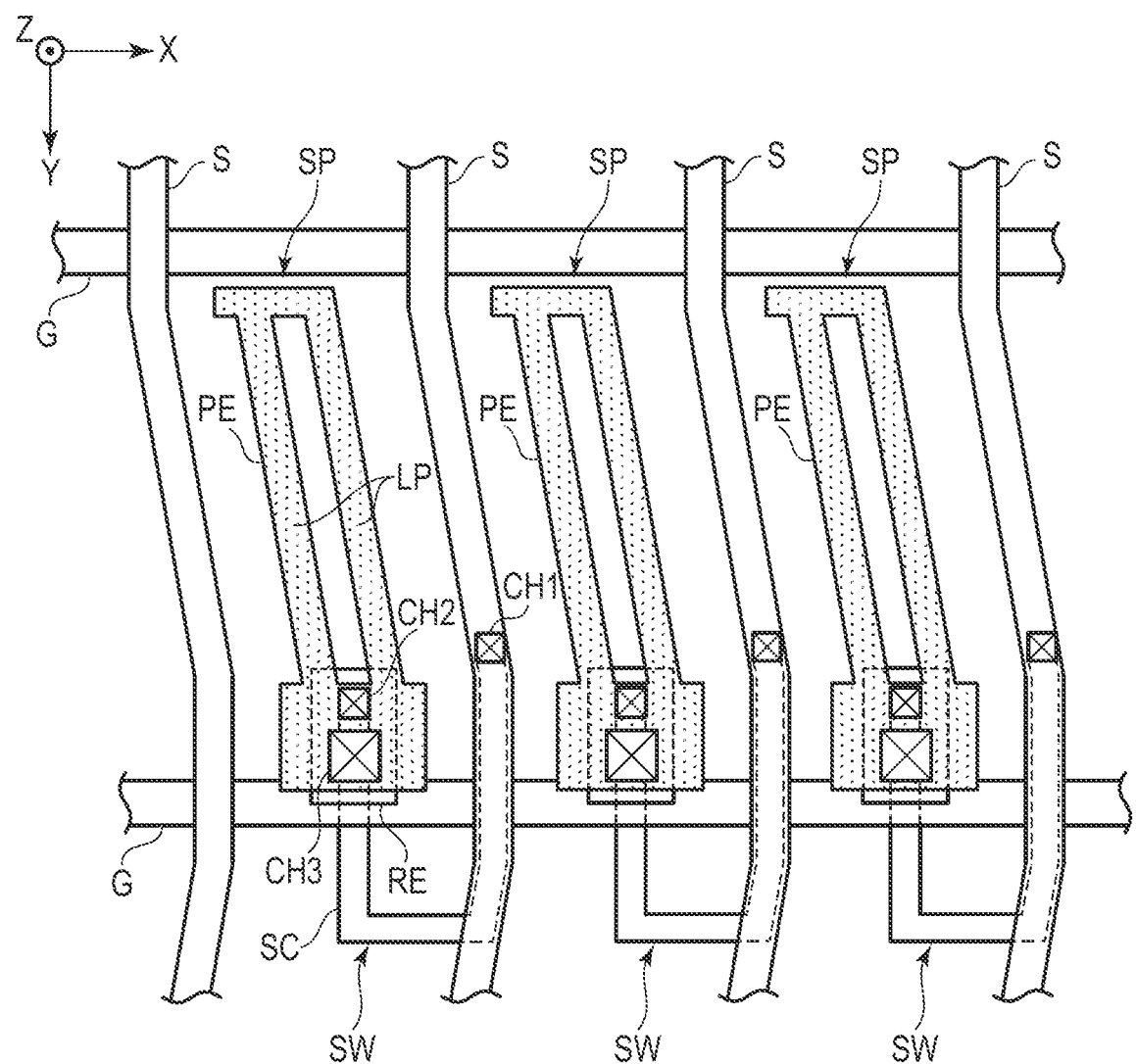
FIG. 4 is a schematic plan view of a structure applicable to a sub-pixel.

FIG. 4 is a schematic plan view of a structure applicable to the sub-pixels SP. In the example shown in this figure, the pixel electrodes PE each comprise two line portions LP. The pixel electrodes PE may comprise more line portions LP or may comprise only one line portion LP. The pixel electrodes PE and the common electrodes CE described above can be formed of, for example, a transparent conductive material, for example, indium tin oxide (ITO).

The line portions LP are inclined with respect to the second direction Y. The signal lines S are also inclined as in the case of the line portions LP. In each of the illustrated sub-pixels SP and sub-pixels SP next to each other along the second direction Y, the shape of the pixel electrodes PE and the signal lines S is line-symmetrical to the shape in the illustrated sub-pixels SP with respect to the second direction Y. Thus, a pseudo-multi-domain pixel layout can be realized. But the pixel layout is not limited to this example and may be of such a structure which implements a multi-domain in one sub-pixel SP or may be a single domain structure.

The switching element SW comprises a semiconductor layer SC and a relay electrode RE. The semiconductor layer SC is connected to the respective signal line S via a respective contact hole CH1, and connected to the respective relay electrode RE via a respective contact hole CH2. The semiconductor layer SC intersects the respective scanning line G between the contact holes CH1 and CH2. The relay electrode RE is connected to the respective pixel electrode PE via a contact hole CH3.

Between the array substrate AR and the counter-substrate CT, a plurality of spacers are disposed. The structure of the spacers will now be described.

FIG. 5 is a plan view showing an example of the arrangement of the spacers of this embodiment. This figure illustrates schematic outlines of adhesion spacers AS and main spacers MS, together with scanning lines G and signal lines S. The adhesion spacers AS are examples of first spacers and the main spacers MS are examples of second spacers.

The main spacers MS are each disposed at a position where a scanning line G and a respective signal line S intersect each other. The adhesion spacers AS are disposed in the vicinities of the respective main spacers MS. The main spacers MS and the adhesion spacers AS each overlap the respective scanning lines G.

The scanning lines G and the signal lines S are all formed of a metallic material, and are light-shielding. Further, the scanning lines G are wider than the signal lines S. Therefore, with such an arrangement that the main spacers MS and the adhesion spacers AS are disposed in positions overlapping the scanning lines G, disturbance in alignment of liquid crystal molecules, which may be caused by these spacers, can be appropriately inhibited. Note that in the example shown in FIG. 5, the main spacers MS and the adhesion spacers AS entirely overlap the respective scanning lines G, but the spacers may protrude from the scanning lines G.

In general display devices in which an array substrate and a counter-substrate comprise a glass substrate, sub-spacers, whose distal ends are not in contact with the other substrate are disposed in the display area in addition to the main spacers, whose distal ends are in contact with other substrate. An areal density of these main spacers and the sub-spacers in the display area is about 1.6%.

By contrast, in the example shown in FIG. 5, sub-spacers are not provided, one main spacer MS is provided per three sub-pixels SP (that is, one pixel PX). Further, the adhesion spacers AS are provided in addition to the main spacers MS. For example, the areal density of the main spacers MS and the adhesion spacers AS in the display area DA is 1.6% or more. For example, the areal density can be defined as the area of the distal end portions of the main spacers MS and the adhesion spacers AS included in a unit area.

In the example shown in FIG. 5, the distance between an adhesion spacer AS and the main spacer MS most close to the adhesion spacer AS is less than the width of the sub-pixel SP along the first direction X. The adhesion spacers AS are disposed, for example, at a ratio of one to six main spacers MS. Note that the arrangement of the main spacers MS and the adhesion spacers AS is not limited to that of this example.

A diameter Das of the distal end portions of the adhesion spacers AS is less than a diameter Dms of the distal end portions of the main spacers MS (Dms>Das). A similar relationship may be established not only for the distal end portions of the spacers MS and AS, but also for proximal or intermediate portions thereof.

Figure 6:
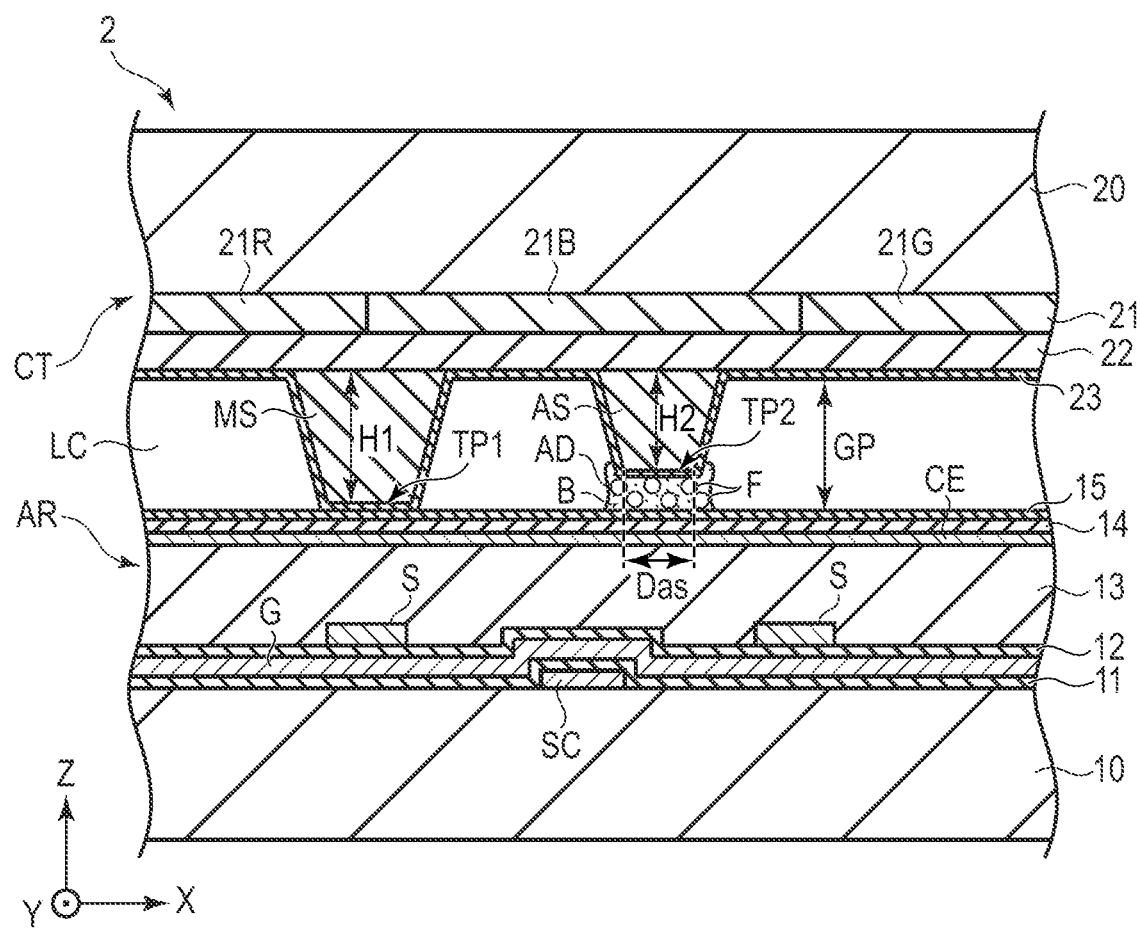
FIG. 6 is a cross-sectional view schematically showing the display panel taken along line VI-VI in FIG. 5.

FIG. 6 is a cross-sectional view schematically showing the display panel 2 taken along line VI-VI in FIG. 5. The array substrate AR comprises a first resin substrate 10, a first insulating layer 11, a second insulating layer 12, a third insulating layer 13, a fourth insulating layer 14 and a first alignment film 15. The insulating layers 11 to 14 are stacked along in the third direction Z.

The semiconductor layer SC is placed between the first resin substrate 10 and the first insulating layer 11. Some other insulating layer may be interposed between the semiconductor layer SC and the first resin substrate 10. The scanning lines G are placed between the first insulating layer 11 and the second insulating layer 12. The signal lines S are placed between the second insulating layer 12 and the third insulating layer 13. The common electrodes CE are placed between the third insulating layer 13 and the fourth insulating layer 14.

Although it is not shown in FIG. 6, but the pixel electrodes PE are placed on the fourth insulating layer 14. The first alignment film 14 covers the pixel electrodes PE and the third insulating layer 13. The third insulating layer 13 is a planarizing film formed of, for example, an organic resin material, and is thicker than the other insulator layer 11, 12 or 14.

The counter-substrate CT comprises a second resin substrate 20, a color filter layer 21, an overcoat layer 22 and a second alignment film 23. The color filter layer 21 covers the second resin substrate 20. For example, the color filter layer 21 includes color filters 21R, 21G and 21B, overlapping red, green and blue sub-pixels SP, respectively. The overcoat layer 23 covers the color filter 22. The second alignment film 24 covers the overcoat layer 23.

The first resin substrate 10 and the second resin substrate 20 are formed of a resin material, for example, polyimide or the like, and are flexible. In this case, a flexible display panel 2 can be obtained, and therefore as discussed above, the display panel 2 can be bent.

The main spacers MS and the adhesion spacers AS project from the counter-substrate CT towards the array substrate AR. In the example shown in FIG. 6, the main spacers MS and the adhesion spacers AS are covered by the second alignment film 23. But at least part of the main spacer MS and the adhesion spacer AS may not necessarily be covered by the second alignment film 23.

For example, the main spacers MS and the adhesion spacers AS are circular in planar shape as shown in FIG. 5, and the cross-section thereof is a trapezoid as shown in FIG. 6. But the planar shape and the cross-sectional shape of the main spacers MS and the adhesion spacer AS are not limited to these of the example. As another example, the main spacers MS and the adhesion spacers AS may have a planar shape elongated along a predetermined direction.

The distal end portion TP1 of each of the main spacers MS is in contact with the array substrate AR (the first alignment film 15). That is, a height H1 of the main spacers MS substantially coincides with a cell gap GP between the array substrate AR and the counter-substrate CT.

On the other hand, a height H2 of the adhesion spacers AS is less than the cell gap GP and the height H1. That is, the distal end portions TP2 of the adhesion spacers AS oppose the array substrate AR with a gap therebetween.

Between the adhesion spacer AS and the array substrate AR, an adhesive member AD is disposed. The adhesive member AD adheres the distal end portions TP2 of the adhesion spacers AS and the array substrate AR together. The thickness of the adhesive member AD is less than, for example, the height H2 of the adhesion spacers AS. In this embodiment, a total height of the adhesion spacers AS and the adhesive member AD is the same as the height H1 of the main spacers MS. The total height of the adhesion spacers AS and the adhesive member AD can be referred to as a sum of the height H2 of the adhesion spacers AS and the thickness of the adhesive member AD.

The main spacers MS keeps the cell gap GP between the array substrate AR and the counter-substrate CT at constant. The adhesion spacers AS adhere the array substrate AR and the counter-substrate CT together and inhibit displacement between these.

The adhesive member AD comprises a base material B, which is, for example, acryl resin and a plurality of fillers F added to the base material B. The fillers F are, for example, spherical silica particles, but may be formed from some other material. With the fillers F, a constant distance is maintained between the distal end portions TP2 and the array substrate AR. Further, the base material B may be a resin other than the acryl resin. For example, the base material B may be formed from a polyester-, ethylene vinyl acetate (EVA)-, polyamide-, polyurethane-based thermoplastic resin, or an olefin-based resin or the like.

As a volume ratio of the fillers F in the adhesive member AD is greater, the gap is more easily to be formed between the distal end portions TP2 and the array substrate AR. On the other hand, if the volume ratio is excessively great, adhesivity of the adhesive member AD becomes weak. Therefore, it is preferable that the volume ratio be 50% or less.

In order to appropriately interpose the fillers F between the distal end portions TP2 and the array substrate AR, it is preferable that the diameter of the fillers F be less than the diameter Das of the distal end portions TP2 of the adhesion spacers AS. Further, it is preferable that the diameter of the fillers F be less than a difference between the cell gap GP and the height H2. For example, the diameter Das is 5 μm or greater, the cell gap GP is 3 μm, the height H2 is 2 μm, and the diameter of the fillers F is 1 μm or less.

Next, a method of manufacturing the display device 1 will be described.

Figure 7:
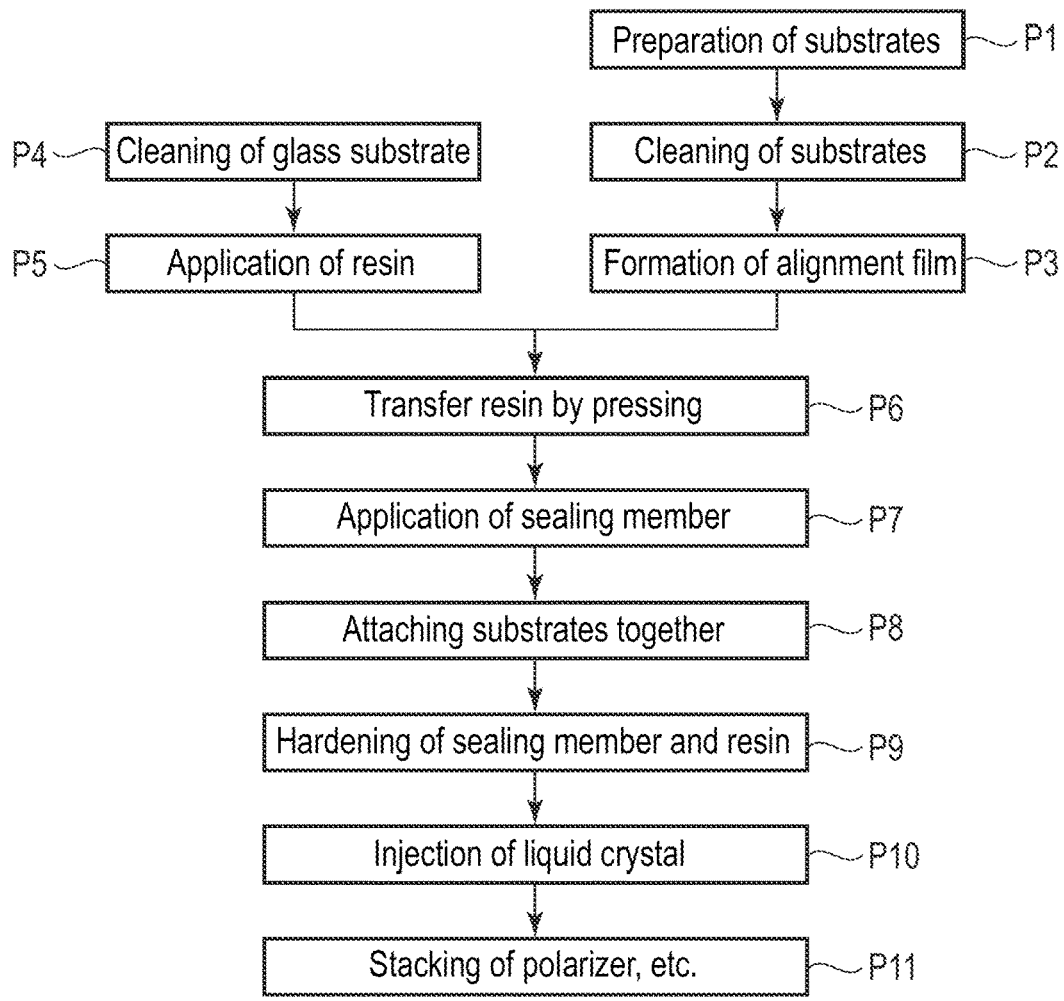
FIG. 7 is a flowchart showing an example of a method of manufacturing the display device.

FIG. 7 is a flowchart illustrating an example of the method of manufacturing the display device 1. First, the array substrate AR comprising the first resin substrate 10, the insulating layers 11 to 14, the scanning lines G, the signal lines S, the switching elements SW, the pixel electrodes PE and the common electrodes CE, and the counter-substrate CT comprising the second resin substrate 20, the color filter layer 21, the overcoat layer 22, the main spacers MS and the adhesion spacers AS are manufactured (processing step P1). Further, the array substrate AR and the counter-substrate CT are cleaned (processing step P2), and the first alignment film 15 and the second alignment film 23 are formed on these substrates, respectively, (processing step P3).

At this time, the main spacers MS and the adhesion spacers AS are covered by the second alignment film 23. Before being hardened, the second alignment film 23 is fluid, and therefore the second alignment film 23 may flow out of the distal ends of the main spacers MS and the adhesion spacers AS. In this case, the distal ends of the main spacers MS and the adhesion spacers AS are exposed from the second alignment film 23, or are covered by the second alignment film 23 which is thinner than the other parts.

Apart from the processing steps P1 to P3, a glass substrate is prepared, and its surface is cleaned (processing step P4). Further, a resin material, which gives rise to the basis of the adhesive member AD, is applied to the glass substrate (processing step P5). To this resin material, the fillers F are added in advance. Subsequently, the glass substrate is pressed against the counter-substrate CT, and thus the resin material applied to the glass substrate is transferred to the distal end portions TP2 of the adhesion spacer AS (processing step P6). In this manner, the adhesive member AD is attached to the distal end portions TP2.

In these steps, the region of the glass substrate, where the resin material is to be applied, may be adjusted in order to avoid the adhesive member AD from attaching to the distal end portions TP1 of the main spacers MS, or the adhesive member AD may be removed after attaching the adhesive member AD to the distal end portions TP1 of the main spacers MS. Or, the step may advance to a later process with the adhesive member AD still attaching to the distal end portions TP1 of the main spacers MS. In this case, after adhering the counter-substrate CT and the array substrate AR together, a thin adhesive member AD is formed around the distal end portions TP1 as well.

Note that the method of attaching the adhesive member AD to the distal end portions TP2 of the adhesion spacers AS is not limited to the transfer using the glass substrate. The adhesive member AD may be attached to the distal end portions TP2, for example, by an ink jet method.

After attaching the adhesive member AD to the distal end portions TP2 of the adhesion spacers AS, a not-yet-hardened sealing member SE is applied to the array substrate AR or the counter-substrate CT (processing step P7). Further, the array substrate AR and the counter-substrate CT are adhered together (processing step P8).

After that, the array substrate AR and the counter-substrate CT adhered together are heated, for example, at 230° C. for about 30 minutes to harden the sealing member SE (processing step P9). With this heating, the adhesive member AD which attached to the distal end portions TP2 of the adhesion spacer AS hardens as well. In order to promote thermal hardening of the adhesive member AD, a thermoset agent may be contained in the adhesive member AD.

Then, in a vacuum atmosphere, a liquid crystal material is injected through an inlet provided in the sealing member SE (processing step P10). Further, the first polarizer PL1, the second polarizer PL2, the reflective polarizing film RF, the first reinforcing member RM1, the second reinforcing member RM2, the cover member 4 and the like, described above, are attached onto the display panel 2 (processing step P11). After that, the backlight 3, the controller 5 and the flexible printed circuit 6 are disposed, and thus the display device 1 is completed.

Note that the above-provided example is discussed on the assumption of the case where the liquid crystal layer LC is formed by a vacuum injection method, but liquid crystal layer LC can be formed by a drop method (ODF method). That is, after applying the sealing member SE to one of the array substrate AR and the counter-substrate CT, the liquid crystal material is dropped inside, and both substrates are attached together in a vacuum atmosphere. After that, with the heat used to harden the sealing member SE, the adhesive member AD hardened in a similar manner to that of the example discussed above.

If the adhesion spacers AS are not provided, the array substrate AR and the counter-substrate CT are adhered together only by the sealing member SE. In this case, in the display area DA, elements such as the pixel electrodes PE and the like of the array substrate AR and elements such as the color filter layers 21 and the like of the counter-substrate CT may be displaced from each other. Such a displacement is easy to occur especially in the sheet-type display device 1 with the flexible array substrate AR and counter-substrate CT as in this embodiment. Further, in the case where the display panel 2 is partially or entirely bent as exemplified in FIG. 2, a strong stress is applied on the array substrate AR and the counter-substrate CT, and therefore the amount of the displacement between the substrates is also increased.

When the array substrate AR and the counter-substrate CT displace from each other, light to pass the color filter layer 21 of a certain sub-pixel SP passes the next sub-pixel SP, thereby possibly causing mixture of colors. Further, the distal ends of the main spacers MS may damage the first alignment film 15, which may impart undesired alignment ability to the first alignment film 15. With these causes, the display quality of the display device 1 can be decreased.

On the other hand, when the adhesion spacers AS attached to the array substrate AR by the adhesive member AD is provided as in this embodiment, the array substrate AR and the counter-substrate CT are not easily displaced in the display area DA. Further, the distal ends of the main spacers MS do not easily damage the first alignment film 15.

The adhesion spacers AS may be arranged to be distributed at a uniform density over the entire display area DA. As will be discussed in some examples provided below, the adhesion spacers AS may be disposed regionally in the display area DA.

Figure 8:
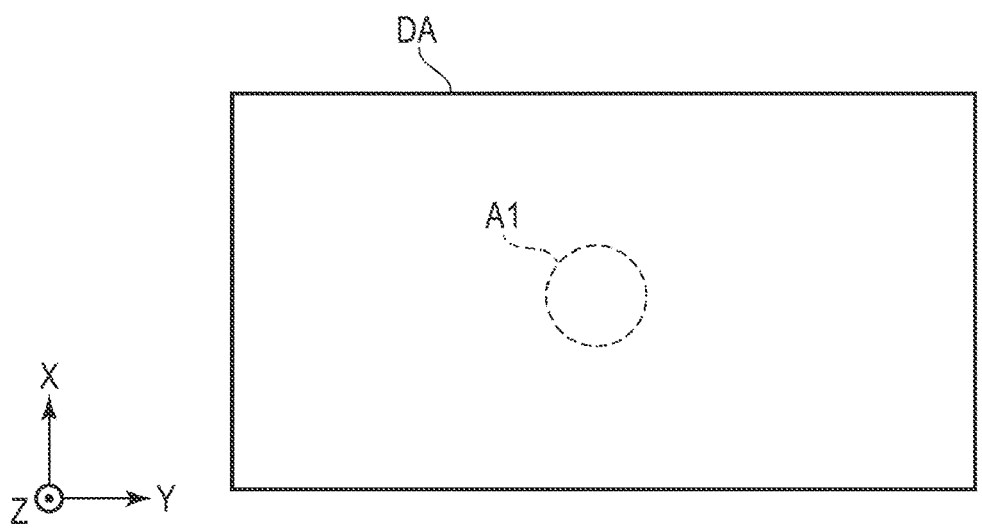
FIG. 8 is a schematic plan view showing the first arrangement example of the adhesion spacer in the display area.

FIG. 8 is a schematic plan view showing the first arrangement example of the adhesion spacer AS in the display area DA. The array substrate AR and the counter-substrate CT are adhered together around the display area DA by the sealing member SE. Therefore, for example, the display panel 2 is not bent as shown in FIG. 2, but in a flat state, the substrates are not easily displaced from each other in the vicinities of the sides of the display area DA. In contrast, the substrates are easily displaced in the center of the display area DA, spaced apart from the sealing member SE.

Therefore, as shown in FIG. 8, a plurality of adhesion spacers AS may be disposed in the first area A1 including the center of the display area DA. Or, in order to increase the density of the adhesion spacers AS in the first area A1, the adhesion spacers AS may be disposed in the entire display area DA.

Figure 9:
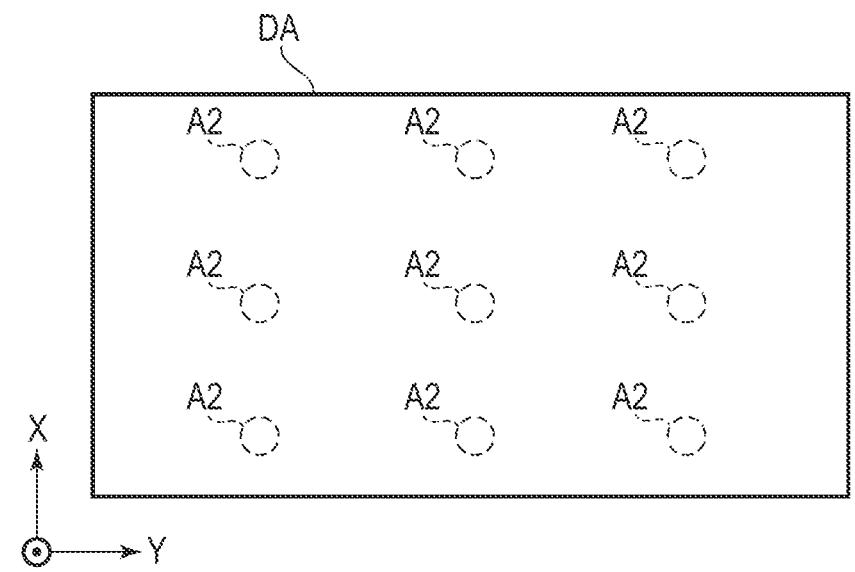
FIG. 9 is a schematic plan view showing the second arrangement example of the adhesion spacer in the display area.

FIG. 9 is a schematic plan view showing the second arrangement example of the adhesion spacers AS in the display area DA. When forming the liquid crystal layer LC by the above-mentioned drop method, the adhesive member AD is not yet hardened when dropping the liquid crystal material. When the liquid crystal material is brought into contact with the adhesive member AD in this state, an impurity may enter the liquid crystal material from the adhesive member AD.

Therefore, as shown in FIG. 9, a plurality of adhesion spacers AS may be disposed in each of plurality of second areas A2 dispersed in the display area DA. In this case, the liquid crystal material is dropped on a region while avoiding the second areas A2, thus making it possible to inhibit the not-yet-hardened adhesive member AD from being brought into contact with the liquid crystal material.

Figure 10:
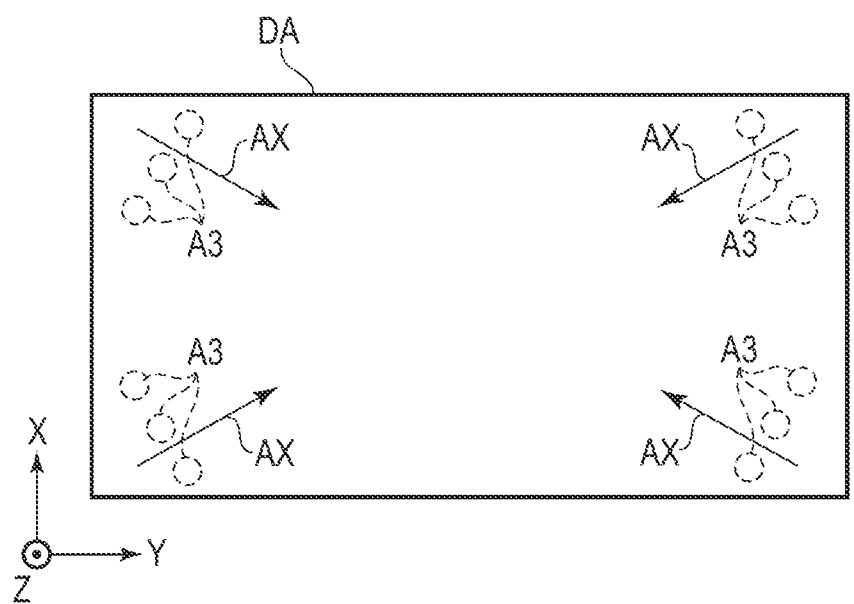
FIG. 10 is a schematic plan view showing the third arrangement example of the adhesion spacer in the display area.

FIG. 10 is a schematic plan view showing the third arrangement example of the adhesion spacers AS in the display area DA. When the array substrate AR and the counter-substrate CT are flexible as in this embodiment, the substrates may be displaced from each other as the first polarizer PL1 and the second polarizer PL2 attached on the display panel 2 contract. More specifically, the second polarizer PL2 hardly contracts because it is supported by the cover member 4, but the first polarizer PL1 contracts by a large amount of contraction because it is not supported sufficiently with other members.

The amount of contraction of the first polarizer PL1 increases along directions (diagonal directions) towards the center from four corners of the display area DA. Therefore, as shown in FIG. 10, a plurality of adhesion spacers AS may be disposed in each of a plurality of third areas A3 arranged along a direction intersecting a contraction axis AX of the first polarizer PL1.

In the example shown in FIG. 10, three third areas A3 are provided in each of the four corners of the display area DA, and the three third areas A3 are arranged along a direction normal to the contraction axis AX. But the number of third areas A3 provided in the four corners is not limited to three. Or, an elongated third area A3 extending along the direction normal to the contraction axis AX may be set.

Apart from the above, the region where the adhesion spacers AS are disposed can be set in various manners. For example, when the display panel 2 is bent in the vicinities of the first side E1 and the second side E2 as exemplified in FIG. 2, the arrangement area of the adhesion spacers AS may be set in a range of a certain distance from the first side E1 and the second side E2.

Here, with reference to comparative examples with the present embodiment, the main advantageous effect exhibited by the display device 1 of this embodiment will be described.

Figure 11:
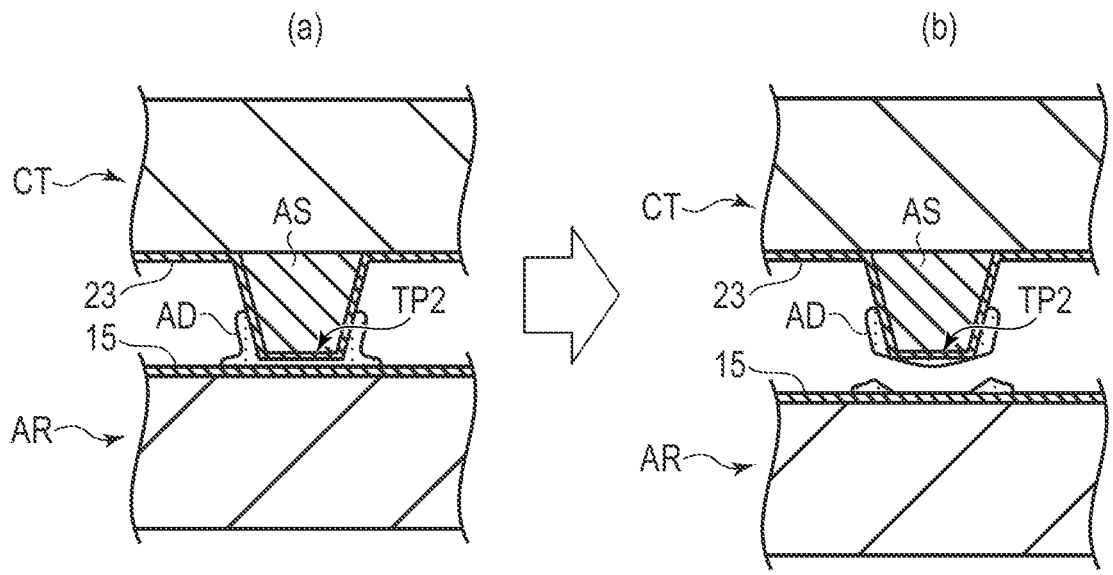
FIG. 11 is a schematic cross section of a structure of a display device according to a comparative example.

FIG. 11 is a schematic sectional view showing a structure of a display device according to a comparative example. In this comparative example, as shown in FIG. 11, part (a), the fillers F are not added to the adhesive member AD. In this case, when the counter-substrate CT and the array substrate AR are adhered together, the distance between a distal end portions TP2 of an adhesion spacers AS and the array substrate AR is reduced, and thus the adhesive member AD may be extruded to the surroundings of the adhesion spacer AS.

When the adhesive member AD hardens in this state, a sufficient amount of the adhesive member AD is not interposed between the distal end portion TP and the array substrate AR, thus weakening the adhesivity. Therefore, when an external force is applied, the adhesion spacer AS and the array substrate AR are easily separated from each other as shown in FIG. 11, part (b).

On the other hand, in the present embodiment, the fillers F are added to the adhesive member AD. With the fillers F, a certain distance is maintained between the distal end portion TP2 and the array substrate AR, and therefore the distal end portion TP2 and the array substrate AR are adhered to each other by a sufficient amount of the adhesive member AD. Thus, the adhesion spacer AS and the array substrate AR are not easily separated from each other and the displacement between the substrates can be appropriately inhibited, making it possible to improve the display quality of the display device 1.

Apart from the above, various advantageous effects can be obtained from this embodiment.

Second Embodiment

The second embodiment will now be described. Unless otherwise specified, the structures and the effects are the same as those of the first embodiment.

Figure 12:
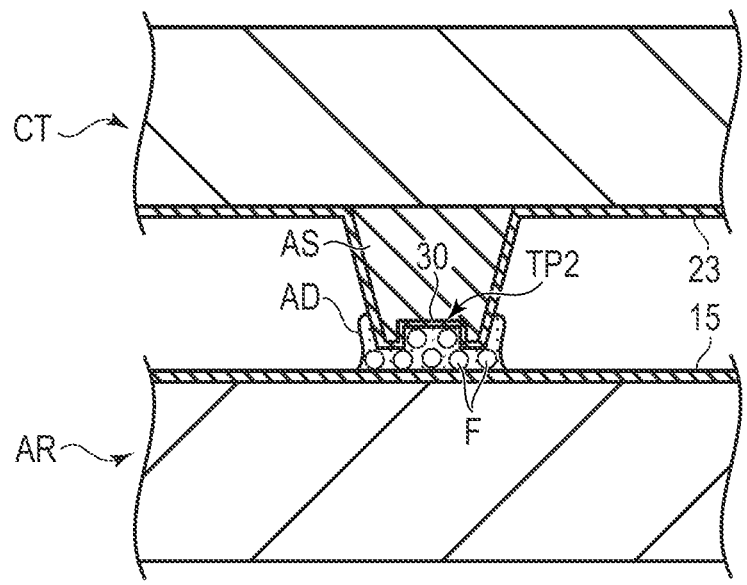
FIG. 12 is a schematic cross section showing a structure of an adhesion spacer according to the second embodiment.

FIG. 12 is a cross-sectional view schematically showing a structure of an adhesion spacer AS according to the second embodiment. In this figure, the structures of the array substrate AR and the counter-substrate CT are simplified. As in the case of the first embodiment, an adhesion spacer AS extends from the counter-substrate CT towards the array substrate AR, and the adhesive member AD is disposed between the adhesion spacer AS and the array substrate AR.

In the adhesive member AD, the fillers F are added. In this embodiment, a concavity 30 is provided in a distal end portion TP2 of the adhesion spacer AS, which is recessed towards the counter-substrate CT. The adhesive member AD fills the concavity 30. For example, a depth of the concavity 30 is 1 μm or less.

Figure 13:
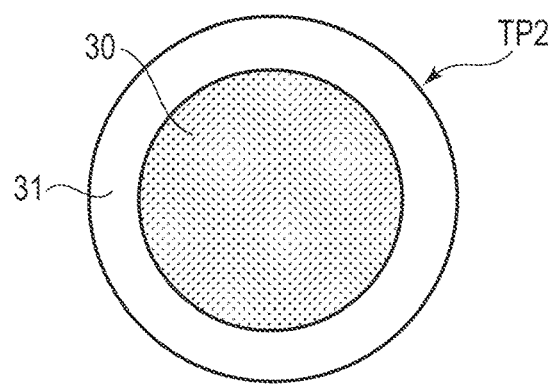
FIG. 13 is a schematic plan view showing an example of a distal end portion of the adhesion spacer in which a concavity is provided.

FIG. 13 is a schematic plan view showing an example of the distal end portion TP2 in which the concavity 30 is formed. In this example, the concavity 30 is circular. Further, the distal end portion TP2 comprises an annular wall portion 31 surrounding the concavity 30.

Figure 14:
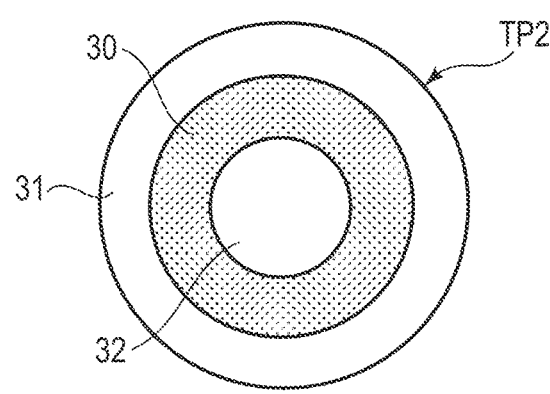
FIG. 14 is a schematic plan view showing another example of the distal end portion of the adhesion spacer in which a concavity is provided.

FIG. 14 is a schematic plan view showing another example of the distal end portion TP2 in which a concavity 30 is provided. In this example, the concavity 30 is in an annular shape which surrounds a central portion 32 of the distal end portion TP2. From another point of view, the concavity 30 is provided between the wall portion 31 and the central portion 32.

Figure 15:
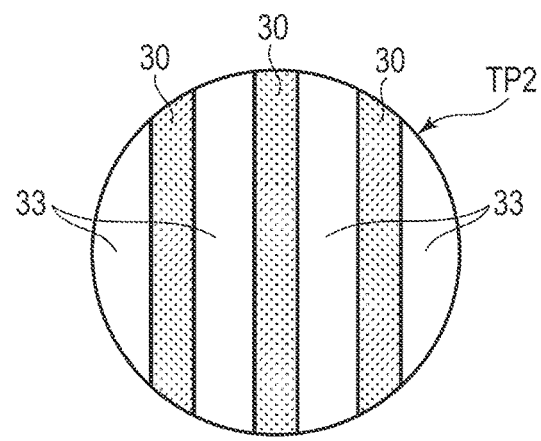
FIG. 15 is a schematic plan view showing still another example of the distal end portion of the adhesion spacer in which a concavity is provided.

FIG. 15 is a schematic plan view showing still another example of the distal end portion TP2 in which the concavity 30 is provided. In this example, a plurality of linear concavities 30 crossing the distal end portion TP2 are arranged at regular intervals via a wall portion 33.

If, in this structure, the adhesive member AD fills the concavities 30 as in the embodiment, a more amount of the adhesive member AD can be interposed between the distal end portion TP2 and the array substrate AR. Thus, the adhesion spacer AS and the array substrate AR can be adhered together further firmly.

When a circular or annular concavity 30 is provided as in the example shown in FIG. 13 or 14, excellent adhesivity can be exhibited even if the array substrate AR and the counter-substrate CT are displaced in any direction. Further, if the concavity 30 is annular as in the example of FIG. 14, the force can be dispersed to the central portion 32 and the wall portion 31 even if a force in a direction to press the array substrate AR and the counter-substrate CT against each other is applied. Thus, it is possible to inhibit the adhesion spacer AS from being partially damaged.

When a plurality of linear concavities 30 crossing the distal end portion TP2 as in the example of FIG. 15, it is possible to improve the resistance to the displacement in a particular direction. Further, even if there are bubbles in the concavities 30 and the adhesive member AD during manufacture, such bubbles can be easily extracted from the concavities 30.

Note that the shape of the concavities 30 is not limited to that of the examples of FIGS. 13 to 15. When the concavities 30 are provided in this embodiment, the fillers F need not to be added to the adhesive member AD.

Third Embodiment

The third embodiment will now be described. Unless otherwise specified, the structures and the effects are the same as those of the embodiments provided above.

Figure 16:
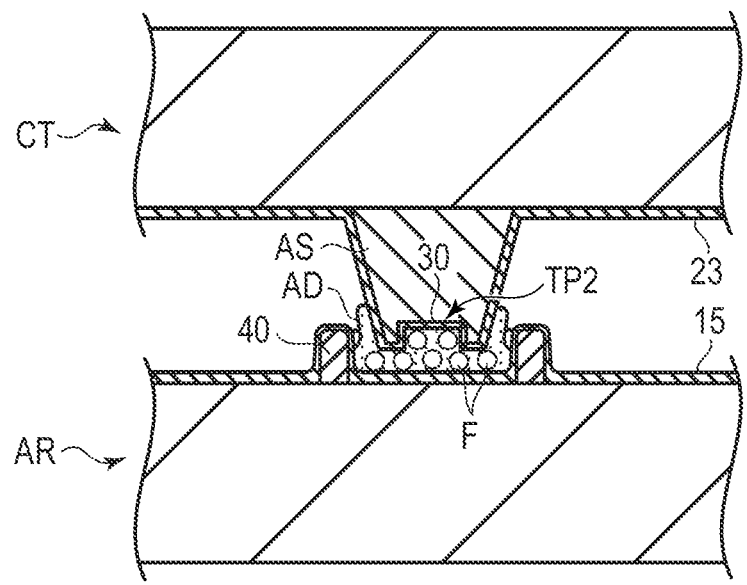
FIG. 16 is a schematic cross section showing structures of an adhesion spacer and its vicinity according to the third embodiment.

FIG. 16 is a cross-sectional view schematically showing structures of an adhesion spacer AS and its surroundings according to the third embodiment. In this figure, the structures of the array substrate AR and the counter-substrate CT are simplified. In the example illustrated, the adhesion spacer AS comprises a concavity 30 as in the case of the second embodiment. However, the adhesion spacer AS may not comprise a concavity 30.

In this embodiment, the array substrate AR comprises a projection portion 40 which surrounds a distal end portion TP2 of an adhesion spacer AS. The projection portion 40 can be formed, for example, of acryl resin, but it is not limited to this example.

At least a part of the projection portion 40 opposes a side surface of the adhesion spacer AS with a gap therebetween. In the example of FIG. 16, the projection portion 40 is covered by a first alignment film 15. But at least a part of the projection portion 40 need not be covered by the first alignment film 15. Further, the projection portion 40 may be disposed on the first alignment film 15.

An adhesive member AD is disposed in an inner side of the projection portion 40. With such a structure, the not-yet-hardened adhesive member AD is stopped by the projection portion 40 during manufacture. Thus, the adhesive member AD does not spread excessively around the distal end portion TP2.

The adhesive member AD is in contact with the side surface of the projection portion 40 and a side surface of the adhesion spacer AS (a side surface of the second alignment film 23). In this manner, a contact area between the members on an array substrate AR side and those on a counter-substrate CT side and the adhesive member AD is increased, and therefore improvement of the adhesivity can be expected.

Fourth Embodiment

The fourth embodiment will now be described. Unless otherwise specified, the structures and the effects are the same as those of the embodiments provided above.

Figure 17:
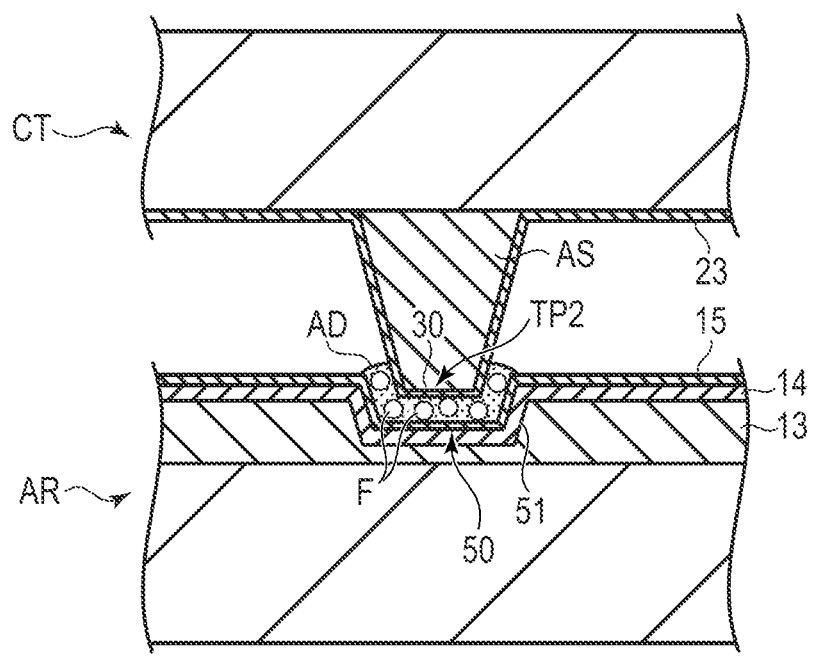
FIG. 17 is a schematic cross section showing structures of an adhesion spacer and its vicinity according to the fourth embodiment.

FIG. 17 is a cross-sectional view schematically showing structures of an adhesion spacer AS and its surroundings according to the fourth embodiment. In this figure, the structures of the array substrate AR and the counter-substrate CT are simplified. In this embodiment, the array substrate AR comprise a hole portion 50 of the adhesion spacer AS in a position opposing the distal end portion TP2.

The hole portion 50 can be formed, for example, by making a hole 51 in the third insulating layer 13, which is a planarizing film. That is, if the hole 51 is made to have a sufficient depth in the third insulating layer 13, which is thicker than the other insulating layers, the fourth insulating layer 14 and the first alignment film 15 is recessed according to the shape of the hole 51, and thus, the hole portion 50 is formed in the inner surface of the array substrate AR.

The hole portion 50 is filled with the adhesive member AD. With such a structure, the not-yet-hardened adhesive member AD is stopped by the hole portion 50 during manufacture. Thus, the adhesive member AD does not spread excessively around the distal end portion TP2. Further, with the by the hole portion 50 thus provided, a sufficient gap can be created between the distal end portion TP2 and the array substrate AR (a bottom surface of the hole portion 50). Thus, a sufficient amount of the adhesive member AD can be disposed between the distal end portion TP2 and the array substrate AR.

In the example of FIG. 17, the distal end portion TP2 is located inside the hole portion 50. The adhesive member AD is in contact with the bottom surface and the side surface of the hole portion 50, and further the distal end portion TP2 of the adhesion spacer AS and a part of the side surface thereof. With this structure, the contact area between the members on the array substrate AR side and those on the counter-substrate CT side and the adhesive member AD is increased, and therefore the improvement of the adhesivity can be expected.

Note that, in the example of FIG. 17, the distal end portion TP2 is flat. As another example, the above-discussed concavity 30 may be provided in the distal end portion TP2. Further, the above-discussed projection portion 40 may be provided around the distal end portion TP2.

Fifth Embodiment

The fifth embodiment will now be described. Unless otherwise specified, the structures and the effects are the same as those of the embodiments provided above.

Figure 18:
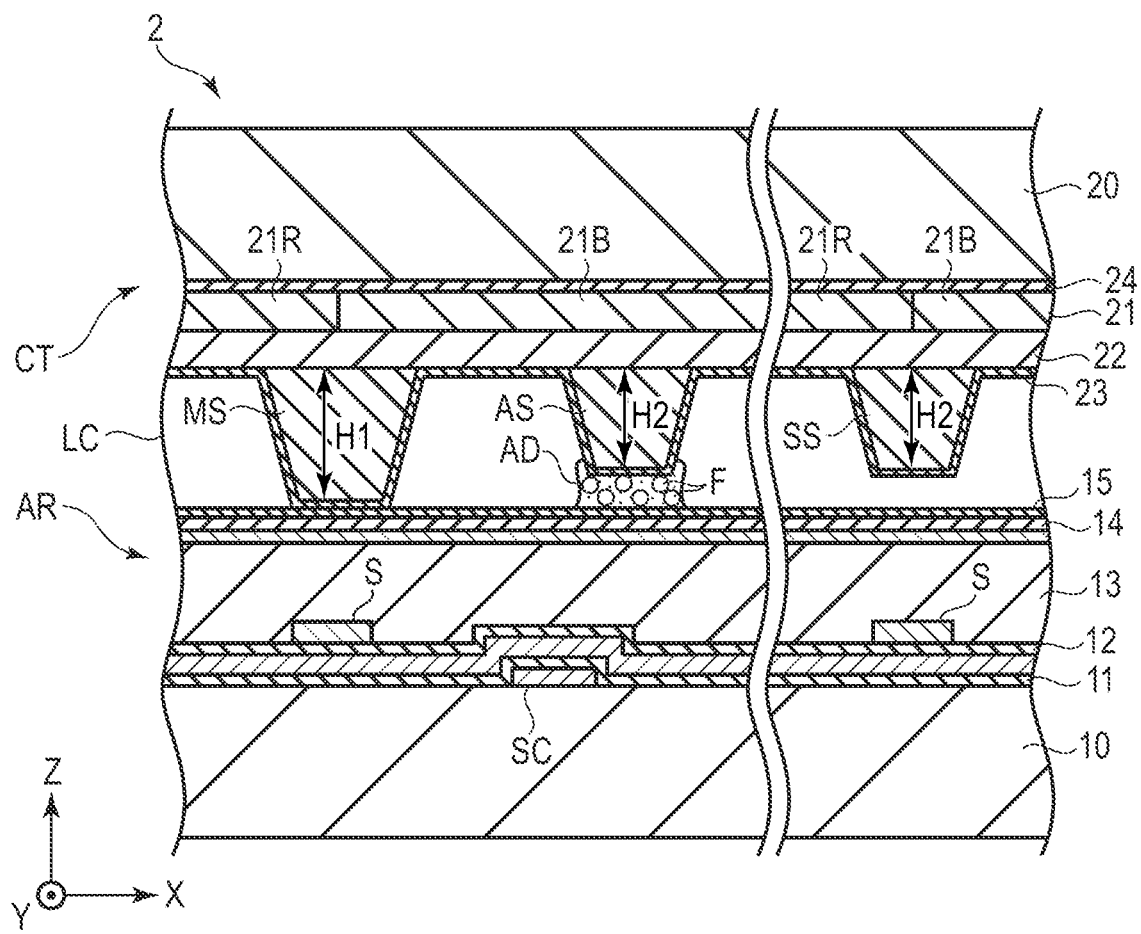
FIG. 18 is a schematic cross-sectional view showing a display panel according to the fifth embodiment.

FIG. 18 is a schematic cross-sectional view of a display panel 2 according to this embodiment. In this embodiment, the counter-substrate CT comprises a light-shielding layer 24. Further, the display panel 2 comprises a sub-spacer SS in addition to the main spacer MS and the adhesion spacer AS.

The light-shielding layer 24 is disposed between the second resin substrate 20 and the color filter layer 21. The sub-spacer SS opposes the array substrate AR with a gap therebetween as in the case of the adhesion spacer AS and has a height H2 which is the same as that of the adhesion spacer AS. Between the sub-spacer SS and the array substrate AR, an adhesive member AD is not provided. For example, when an external force is applied to the display panel 2, the sub-spacer SS is in contact with the array substrate AR, thereby inhibiting excessive deformation of the cell gap.

Figure 19:
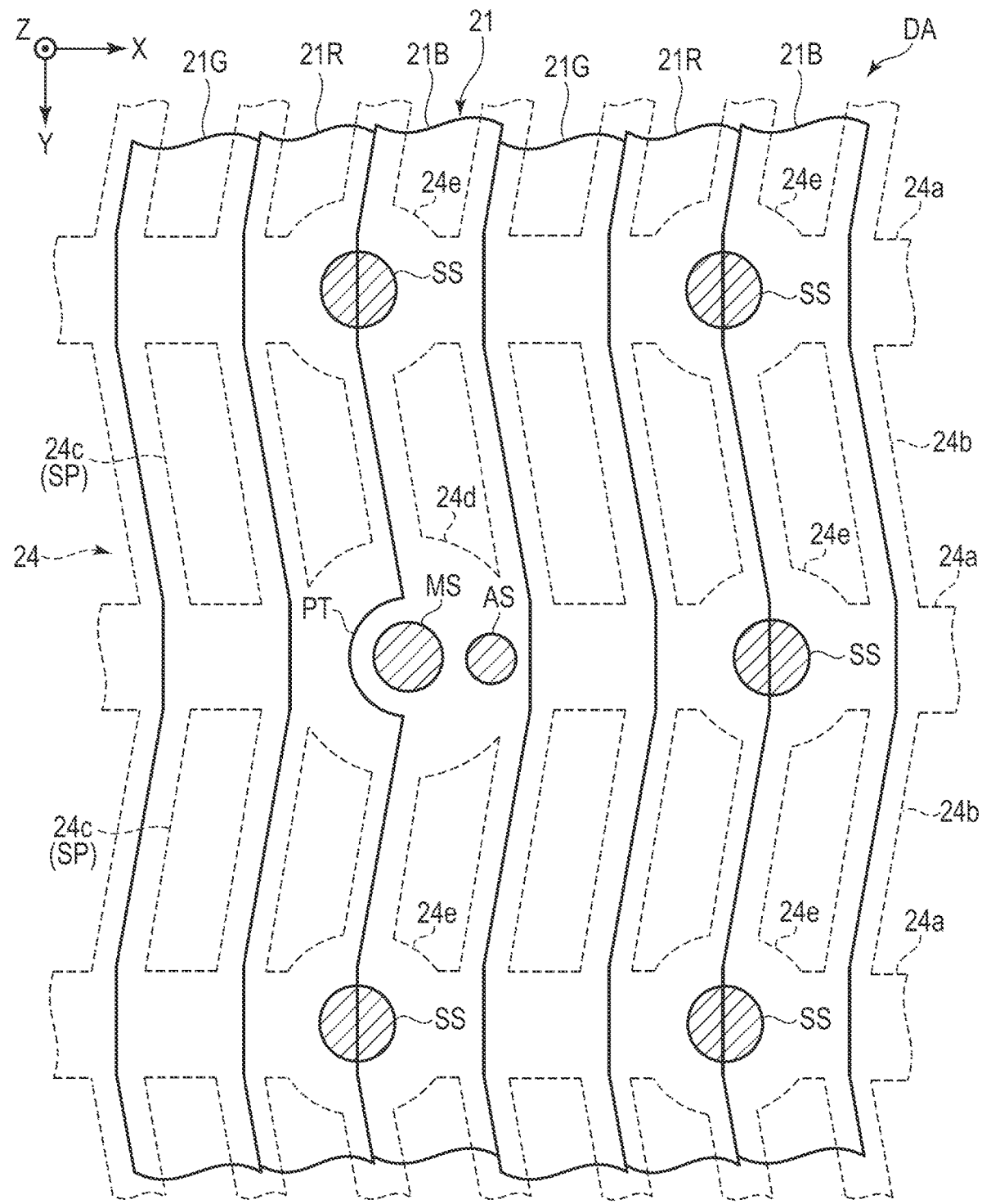
FIG. 19 is a schematic plan view showing an example of arrangement of color filter layers, light-shielding layers and spacers.

FIG. 19 is a schematic plan view showing an example of the arrangement of the color filter layer 21, the light-shielding layer 24 and the spacers MS, AS and SS. Color filters 21R, 22G and 22B, which constitute the color filter layer 21, extend in a belt-like fashion along in the second direction Y to follow the shape of the sub-pixel SP. In the example illustrated, the color filters 21G, 21R and 21B are repeatedly arranged in this order along the first direction X.

The light-shielding layer 24 includes first portions 24a overlapping the respective scanning lines G shown in FIG. 5, and second portions 24b overlapping the respective signal lines S shown in FIG. 5. A width of the first portions 24a along the second direction Y is greater than a width of the second portion 24b along the first direction X. The first portions 24a and the second portions 24b forms openings 24c, respectively, in each sub-pixel SP.

For example, the main spacer MS and the sub-spacer SS are disposed in a location where the respective first portion 24a and the respective second portion 24b intersect each other (a location where the respective scanning line G and the respective signal line S intersect each other). Around the main spacer MS, the light-shielding layer 24 includes a circular expanded portion 24d. Further, around the sub-spacer SS, the light-shielding layer 24 includes a circular expanded portion 24e. A diameter of the expanded portion 24d is greater than a diameter of the expanded portion 24e. The expanded portions 24d, 24e inhibits display errors due to disturbance in alignment of the liquid crystal molecules, which may be caused by the spacers MS and SS.

As in the case of the example shown in FIG. 5, the adhesion spacer AS is located in the vicinity of the main spacer MS. The adhesion spacer AS overlaps the expanded portion 24d. With this structure, it is not necessary to expand the light-shielding layer 24 for the adhesion spacer AS, thereby making it possible to enlarge the opening 24c around the adhesion spacer AS.

Each of the sub-spacers SS overlaps a border between the respective color filters 21R and 21B. On the other hand, the main spacer MS and the adhesion spacer AS do not overlap such boarder, but overlap the respective color filter 21B. The main spacer MS, by its distal end, is brought into contact with the array substrate AR, so as to maintain the cell gap at constant. Further, the adhesion spacer AS adheres the array substrate AR and the counter-substrate CT together such as to inhibit the displacement between these substrates. Therefore, an accuracy to a certain degree is required for the heights of the main spacer MS and the adhesion spacer AS. In this regard, the main spacer MS and the adhesion spacer AS are located not to overlap the border of a respective adjacent pair of color filters. With this configuration, the main spacer MS and the adhesion spacer AS each can be formed accurately to have a desired height.

In the example of FIG. 19, a color filter 21B includes a protrusion PT projecting towards the adjacent color filter 21R. Further, the main spacer MS is disposed to overlap the protrusion PT. With such a structure, overlapping between the main spacer MS and the border between the color filters 21R and 21B can be avoided while locating the main spacer MS in the position where the respective scanning line G and the respective signal line S intersect each other.

As in this embodiment, when the display panel 2 includes a light-shielding layer 24, and each of the spacers MS, AS and SS are located to overlap the light-shielding layer 24, the adverse effect on display can be inhibited even if disturbance in alignment caused by the spacers MS, AS and SS occurs.

The above-provided embodiments are directed to examples of the configuration that each of the spacers MS, AS and SS protrudes from the counter-substrate CT towards the array substrate AR. But each of the spacers MS, AS and SS may protrude from the array substrate AR towards the counter-substrate CT.

Further, each of the embodiments is based on an assumption of the case where the array substrate AR comprises both of pixel electrodes PE and common electrodes CE. But the common electrodes CE may be provided on the counter-substrate CT.

Further, the embodiments are directed to examples of the configuration that the array substrate AR and the counter-substrate CT comprise the resin substrates 10 and 20. But the array substrate AR and the counter-substrate CT may comprise glass substrates in replace of the resin substrates 10 and 20.

All of the display devices that can be implemented by a person of ordinary skill in the art through arbitrary design changes to the display devices described above as embodiments of the present invention come within the scope of the present invention as long as they are in keeping with the spirit of the present invention.

For example, apart from the main spacer MS to maintain the cell gap GP at constant between the array substrate AR and the counter-substrate CT, when an adhesion spacer AS to adhere the array substrate AR and the counter-substrate CT together to inhibit the displacement therebetween, the adhesive member AD does not need to contain the fillers F. This is because with the main spacer MS, the cell gap GP can be maintained at constant, and chances are lower that the adhesive member AD is extruded to around the adhesion spacer AS, as compared to the comparative example shown in FIG. 11. However, as in the case of the comparative example, the distance between the distal end portion TP2 of the adhesion spacer AS and the array substrate AR may become less when adhering the counter-substrate CT and the array substrate AR together, it is preferable that the adhesive member AD should contain fillers F.

Various types of the modified examples are easily conceivable within the category of the ideas of the present invention by a person of ordinary skill in the art and the modified examples are also considered to fall within the scope of the present invention.

For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first substrate;
   a second substrate opposing the first substrate;
   a first spacer projecting from the second substrate towards the first substrate and including a distal end portion opposing the first substrate with a gap therebetween;
   a second spacer projecting from the second substrate towards the first substrate and in contact with the first substrate; and
   an adhesive member adhering the distal end portion and the first substrate together, wherein
   a total height of the first spacer and the adhesive member is the same as a height of the second spacer.

2. The display device of claim 1, wherein
   the adhesive member includes a resin-made base material and a filler added to the base material.

3. The display device of claim 2, wherein
   a diameter of the filler is less than a diameter of the distal end portion.

4. The display device of claim 2, wherein
   a volume ratio of the filler in the adhesive member is 50% or less.

5. The display device of claim 1, wherein
   the distal end portion comprises a concavity recessed towards the second substrate, and
   the adhesive member fills the concavity.

6. The display device of claim 5, wherein
   the distal end portion includes an annular wall portion surrounding the concavity.

7. The display device of claim 5, wherein
   the concavity is annular.

8. The display device of claim 5, wherein
   the concavity is linear crossing the distal end portion.

9. The display device of claim 1, wherein
   the first substrate comprises a projection portion surrounding the distal end portion, and
   the adhesive member is located on an inner side of the projection portion.

10. The display device of claim 1, wherein
    the first substrate comprises a hole portion opposing the distal end portion, and
    the adhesive member fills the hole portion.

11. The display device of claim 1, wherein
    the first substrate includes a flexible first resin substrate,
    the second substrate includes a flexible second resin substrate, and
    the first substrate and the second substrate are at least partially bent.

12. The display device of claim 11, wherein
    a plurality of first spacers each identical to the first spacer and a plurality of second spacers each identical to the second spacer are disposed in the display area, and
    an areal density of the plurality of first spacers and the plurality of second spacers in the display area is 1.6% or more.

13. The display device of claim 1, wherein
    the first substrate comprises a plurality of scanning lines and a plurality of signal lines intersecting the plurality of scanning lines,
    the first spacer is located between two signal lines of the plurality of signal lines at a position overlapping one of the plurality of scanning lines, and
    the second spacer is located at a position where one of the plurality of scanning lines and one of the plurality of signal lines intersect each other.

14. The display device of claim 1, further comprising:
    a plurality of sub-pixels; and
    in plan view, a distance between the first spacer and the second spacer is less than a width of the plurality of sub-pixels.

15. The display device of claim 1, wherein
    a diameter of the distal end portion of the first spacer is less than a diameter of a distal end portion of the second spacer.

16. The display device of the claim 2, wherein a diameter of the filler is less than a difference between a cell gap between the first substrate and the second substrate and a height of the first spacer.

* * * * *